455-296 SR
FIP8106 XR 3,092,776
CROSS REFERENCE SEARCH ROOM

June 4, 1963 N. R. CASTELLINI 3,092,776

METHOD AND APPARATUS FOR THE REDUCTION OF INTERFERENCE

Filed Feb. 12, 1962 2 Sheets-Sheet 1

INVENTOR.
Nello R. Castellini
BY Morse & Hall
ATTORNEYS

METHOD AND APPARATUS FOR THE REDUCTION OF INTERFERENCE

Filed Feb. 12, 1962 2 Sheets-Sheet 2

INVENTOR.
Nello R. Castellini
BY Morse & Hall
ATTORNEYS

3,092,776
METHOD AND APPARATUS FOR THE REDUCTION OF INTERFERENCE

Nello R. Castellini, 42 Bruce Road, Red Bank, N.J.
Filed Feb. 12, 1962, Ser. No. 172,443
24 Claims. (Cl. 325—474)

This invention relates to a method and apparatus for reducing the interference that occurs when desired and undesired waves and noise interact in a detector.

The invention has two aspects. These are fundamentally the same, but it is helpful to think of them as distinct. One aspect deals with the reduction of the amount of interference and the other with the recovery of the signal from interference.

In this statement, "reduction of interference" means a reduction of the interference relative to the desired signal which arrives at the receiver on the stronger carrier; while "recovery of the signal from the interference" means the enhancement of a desired signal which upon arrival at the receiver on the weaker carrier is masked by the stronger signal.

In particular, the invention deals with the elimination of the familiar capture effect which is experienced when the undesired wave at the input to a receiver is the stronger wave, an occurrence common in frequency modulation reception. It is to be emphasized that while this case is the one specifically considered, it is not the only one to which the method and apparatus of this invention is applicable. The method is also applicable to other types of modulation.

Described briefly, it is contemplated by the present invention that a received signal comprising both desired and undesired wave plus noise will be acted upon in such a way that a new wave is produced in which the desired wave is the dominant one, even though it may initially have been weaker than the undesired wave. Essentially, this is done by so transforming the waves that the desired, weaker wave is provided in association with a third wave, relative to which it is the stronger one. It is also contemplated by this invention to disclose apparatus for carrying out the foregoing method.

An object of the present invention is to provide a method for acting upon an electrical wave so as to reduce the interference that results when desired and undesired waves and also noise interact in a detector.

Another object is to eliminate the so-called "capture" effect when a desired wave is present with a stronger undesired wave at the input of a frequency-modulation receiver.

A further object is to provide a method and apparatus for transforming interacting waves comprising a desired signal and a stronger, undesired signal so as to produce a new combination of waves in which the desired wave is associated with a third wave with respect to which it is stronger.

Other objects, purposes, and characteristic features of the invention will, in part, be clear from the accompanying drawing and, in part, pointed out as the description of the invention progresses.

In describing the invention in detail, reference will be made to the accompanying drawings in which like reference characters refer to corresponding parts throughout the different views, and in which.

Figures 1, 2:
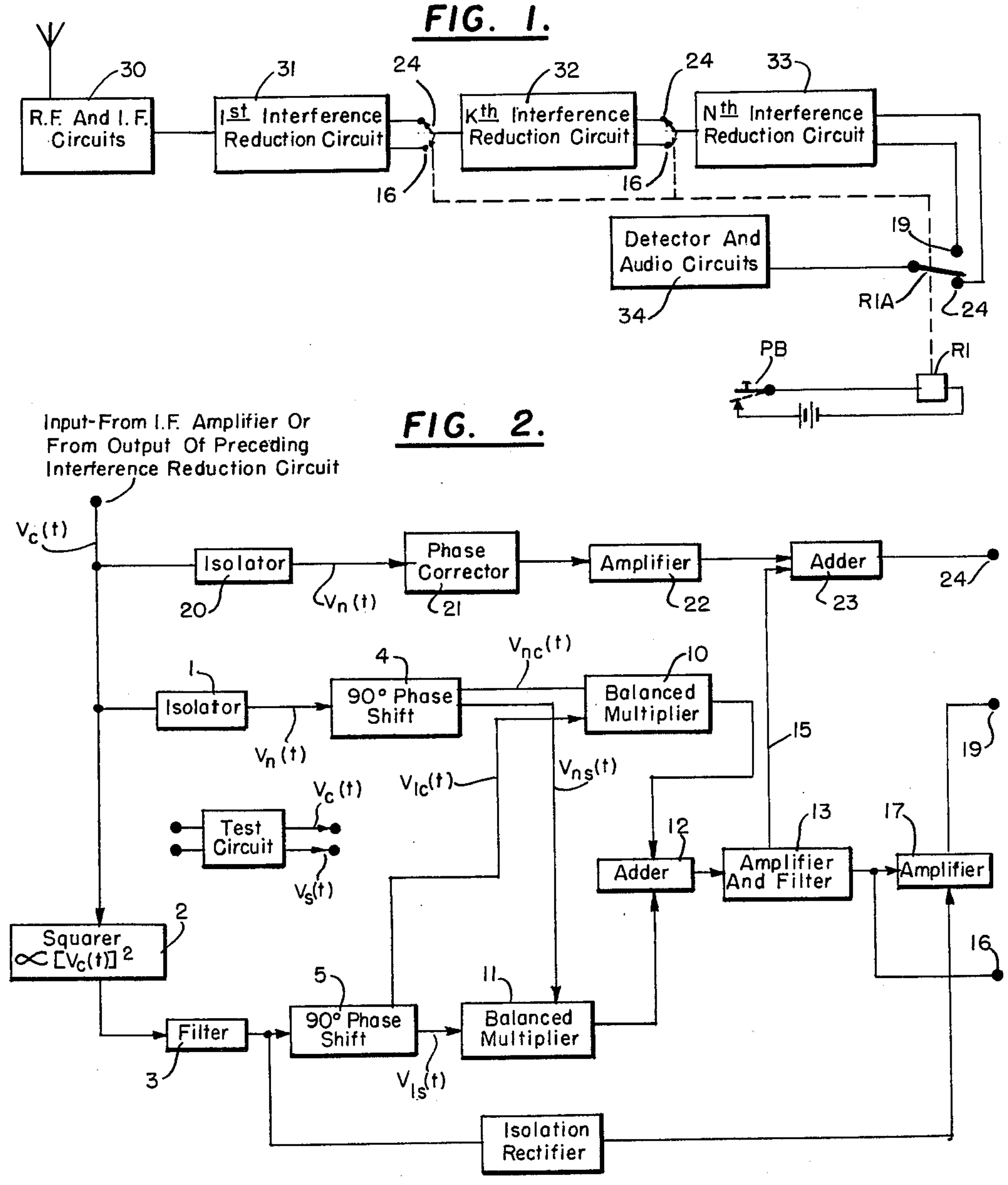
FIGURE 1 is a block diagram of the circuit organization of the present invention.
FIGURE 2 is a block diagram of one of the interference reduction circuits shown in block form in FIGURE 1.

In the description that follows, the words "wave" and "signal" are used synonomously to indicate a modulated (or unmodulated) carrier, and the frequency of the carrier is at the value most convenient for the problem at hand, i.e., at intermediate frequency in radio reception. Moreover, there are two fundamental waves or signals that will receive consideration, i.e., the desired and the undesired. For brevity, they will often be referred to as *a*- and *b*-waves, respectively. Also, symbols pertaining to them will be given these letters as a subscript.

When two interfering modulated waves $S'_a(t)$ and $S'_b(t)$ (it does not matter at this point which one is the signal and which the interference) and noise are present simultaneously at the input of a receiver several alternative situations may attain depending on the relative magnitude of the power in each wave. In all cases the intermediate-frequency output will be a composite wave $V_0(t)$ which, since the frequency translation is essentially linear, may be written $$V_0(t)=S_a(t)+S_b(t)+N(t) \qquad (1)$$

I $S_a(t)$ is weaker (in a power sense) than $S_b(t)$, but both are stronger than the noise, the conventional detector will favor $S_b(t)$, suppressing $S_a(t)$. Therefore, in order to reduce the effect of the *b*-wave, it would be sufficient to obtain from $V_0(t)$ in Equation 1 a new wave in which the *a*-wave is predominant. The invention provides a method for bringing about this change of roles.

The invention is based on the following fundamental result which is true when the noise is negligible. The result can be proven rigorously, but here the approach is heuristic to avoid theoretical complexity. Briefly, the result states that given two waves, as in Equation 1, one of which is weaker relative to the other, the weaker wave may be obtained in association with a third wave relative to which it is the stronger.

The truth of this result rests on the existence of a transformation of the waves involving multiplication, addition, filtering, amplification and phase and time translations. The central position in this transformation is held by: (*a*) the possibility of generating voltages that differ in phase by 90 degrees, (*b*) the possibility of generating a voltage which is essentially the cross term of the square of the input wave, and (*c*) the following trigonometric identify $$\text{Cos } (\theta_1+\theta_2)=\cos\theta_1\cos\theta_2-\sin\theta_1\sin\theta_2 \qquad (2)$$

To obtain some appreciation of the plausibility of these assertions, assume that the *a*- and *b*-waves are cosinusoidal FM waves and that the *b*-wave is stronger than the *a*-wave, then under the assumption of negligible noise, Equation 1 may be written $$V_{0c}(t)=x\cos(\beta_0+\psi_a)+\cos(\beta_0+\psi_b),\ x<1 \qquad (3)$$

where the subscript *c* indicates that the wave equals a sum of cosines; $\beta_0$ is the intermediate-frequency phase, i.e., $\beta_0=2\pi f_0 t$; $\psi_{a,b}$ is a phase that contains the modulation, any phase difference from $\beta_0$ and an arbitrary epoch; and *x* is the ratio of the amplitudes of the *a*- and *b*-waves with the amplitude of the *b*-wave assumed to be unity.

Now, suppose that it is possible by suitable networks to change the phase of $V_{0c}(t)$ in Equation 3 by 90 degrees, thus obtaining a voltage $V_{0s}(t)$ consisting of a sum of sine waves. Tacitly assuming that any amplitude difference and phase translation relative to $V_{0c}(t)$ in Equation 3 is compensated for, such voltage $V_{0s}(t)$ may be expressed as $$V_{0s}(t)=x\sin(\beta_0+\psi_a)+\sin(\beta_0+\psi_b) \qquad (4)$$

Suppose, further, that from Equation 3 it is possible to generate a voltage $F_{1c}(t)$ of the form $$F_{1c}(t)=x \cos (\psi_a-\psi_b) \quad (5)$$

and to change its phase by 90 degrees thus obtaining a voltage $F_{1s}(t)$ equivalent to $V_{0s}(t)$ in Equation 4, that is $$F_{1s}(t)=x \sin (\psi_a-\psi_b) \quad (6)$$

Then, if Equation 3 is multiplied by Equation 5 and Equation 4 by Equation 6, and the difference of these products is taken, the result is a voltage $E_{1c}(t)$, i.e., $$E_{1c}(t)=V_{0c}(t)F_c(t)-V_{0s}(t)F_s(t)$$

which, after reduction using Equation 2, takes the form $$E_{1c}(t)=x \cos (\beta_0+\psi_a)+x^2 \cos (\beta_0+2\psi_a-\psi_b) \quad (7)$$

It is clear from Equation 7 that the first term is the same as the first term in Equation 3, but the second term represents a new wave which is multiplied by $x^2$ and hence it is weaker than the *a*-wave. Therefore, while the detection of $V_{0c}(t)$ in Equation 3 would give an output in which the *b*-modulating signal is predominant, the detection of $E_{1c}(t)$ in Equation 7 will give an output in which the *a*-signal is predominant.

This transformation, of course, hinges on the possibility of generating the voltages of Equations 4, 5 and 6 from the input voltage in Equation 3.

Clearly, Equation 4 and 6 require that it be possible to establish a 90 degree phase difference between a pair of voltages which may be of large relative bandwidth. That is, they demand the realization of physical networks which can obtain from a given voltage two new voltages that have the same harmonic composition as the given voltage, but in which corresponding harmonic components differ in phase by a constant difference of 90 degrees. Further, it is demanded that this be achieved in such a way that all the amplitudes of the harmonic components are multiplied by the same constant.

It is known that ladder networks cannot meet these requirements but that lattice networks can. Discussion of their properties and procedures for designing them appear in literature; see for instance; S. Darlington, "Realization of Constant Phase Difference," in the Bureau of Standards Technical Journal, vol. 29, pp. 96, (1950); also, H. J. Horchard, "Synthesis of Wideband Two Phase Networks," Wireless Engineering, vol. 27, pp. 22, (1950); and W. Saraga, "The Design of Wideband Phase Splitting Networks," Proceedings of the Institute of Radio Engineers, vol. 38, part 2, p. 759, (1950.)

The possibility of generating $F_{1c}(t)$ in Equation 5 from $V_{0c}(t)$ in Equation 3 is suggested by its form which is that of a cross product of the *a*- and *b*-waves. In fact, if $V_{0c}(t)$ is passed through a square law device with the transfer characteristic $z=ay^2$, $a$=constant, the output obtained consists of two types of terms—the cross terms located about zero frequency and terms about twice the intermediate frequency. If the D.C. and latter terms are removed by a filter the cross term $$X_c(t)=\alpha x \cos (\psi_a-\psi_b) \quad (8)$$

remains. This term differs from $F_{1c}(t)$ in Equation 5 by the constant factor $\alpha$. Since $\alpha$ can be compensated for, the squaring $V_{0c}(t)$ in Equation 3 provides a method for generating $F_{1c}(t)$.

In the derivation above, it has been tacitly assumed that the voltage $V_{0c}(t)$ in Equation 3 and the various voltages entering in the operations leading to Equation 7 are all in the same phase. This identity of phase is not achieved directly, even with ideal networks; but with the use of phase and time translating networks, which for simplicity's sake are not indicated, it can be ensured.

At this point a look back suggests new results that also contribute to this specification. It is seen that starting with the voltage $V_{0c}(t)$ in Equation 3 the transformation has produced a voltage $E_{1c}(t)$ in Equation 7. Therefore, a circuit designed to perform the transformation would have both voltages available. As indicated above, the voltage can be obtained in the same phase, and if these voltages, i.e. $V_{0c}(t)$ in Equation 7 are subtracted, the subtraction yields a new wave $$V_{1c}(t)=E_{1c}(t)-V_{0c}(t)=\cos (\beta_0+\psi_b) -x^2 \cos (\beta_0+2\psi_a-\psi_b) \quad (9)$$

in which the original *b*-wave is now present with another wave (in place of the *a*-wave) with which it holds a more favorable position than it did with the original *a*-wave, i.e., $V_{1c}(t)$ contains the *b*-wave in purer form than does $V_{0c}(t)$.

Figure 4:
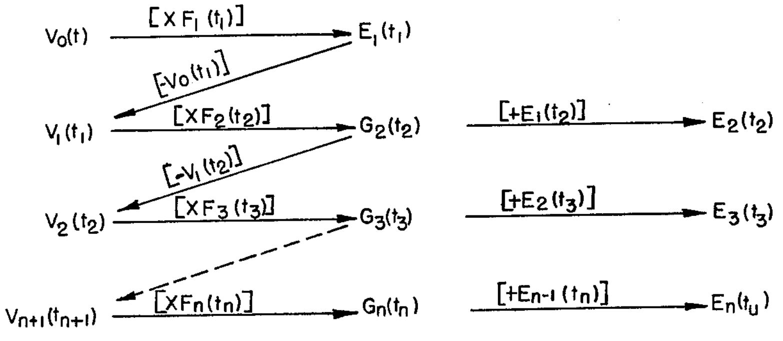
FIGURE 4 is a mathematical flow diagram which illustrates the principles of the invention.

Starting with $V_{0c}(t)$ in which the *b*-wave predominates over the *a*-wave, the transformation leading to $E_{1c}(t)$ in Equation 7 yields a wave in which the *a*-wave is the predominant wave, while the subtraction of $V_{0c}(t)$ from this wave leading to $V_{1c}(t)$ in Equation 9 yields a wave in which the *b*-wave is more predominant than it was in $V_{0c}(t)$. Now, it can be shown that these operations (i.e., the transformation and the subtraction) can be repeated with the derived waves as the starting point. The iteration is illustrated graphically in FIGURE 4 where it is seen that the transformations result in an intermediate wave, the G-wave, which makes its appearance at the first repetition; and the desired V-waves and the E-waves which are obtained from the V-waves by a subtraction and an addition, respectively. The results at each step are new waves which contain, respectively, the *a*-wave and the *b*-wave in further purer form. In fact the operation can be repeated any number of times (ad infinitum in the ideal case) and with each repetition the pureness of the *a*- and *b*-wave increases, although it can never become 100 percent, even in the ideal case.

The discussion above outlines the theory that is at the basis of the disclosure in its barest essential. It assumes either explicitly or tacitly ideal circuits and freedom from circuit noise. It is natural to expect the characteristics of actual circuits and of noise to have a more or less marked effect. The analysis of the influence of these factors is a rather difficult and complex problem. The results obtained indicate that actual circuits put an upper limit to the number of iterations which will be worthwhile to make before reaching a point of no return, while the presence of noise puts bounds on the *a*-signal-to-*b*-signal ratio and on the *b*-signal-to-noise ratio; the bounds must be met by the input wave before the transformation can produce attractive results.

A receiver based on the foregoing theory is shown in FIGURE 1. Blocks 30 and 34 represent, respectively, the circuits of present conventional receivers while the blocks 31, 32 and 33 intervening represent a tandem arrangement of the interference reduction circuit of this invention. Only three of such interference reduction circuits have been shown in FIGURE 1, but in practice more or less than three may be used, as will appear hereinafter.

It is assumed that the output of the intermediate-frequency amplifier consists either of a modulated wave and noise so that the object is to increase the signal-to-noise ratio or that it consists of two modulated waves and noise so that the object is to recover the weaker wave or to obtain the stronger wave in purer form according to the theory previously presented. For this reason the boxes are shown with two output leads and with one input lead. Relay R1 may be selectively picked up or dropped away in accordance with the desired mode of operation as described hereinafter.

The number of times that the interference reduction operation can be performed depends on the degree of balance that can be achieved in the generation of the quadrature voltages and maintained in the ensuing operations. Also, it depends on the signal-to-noise ratio in a more complex way. However, no matter how many times the operation is repeated, the circuits in the cascaded arrangement are essentially the same (only the input to it changes and the balance requirements may become more stringent) so that it is sufficient to describe the first circuit in detail and note the differences in the intervening circuits.

Figure 3:
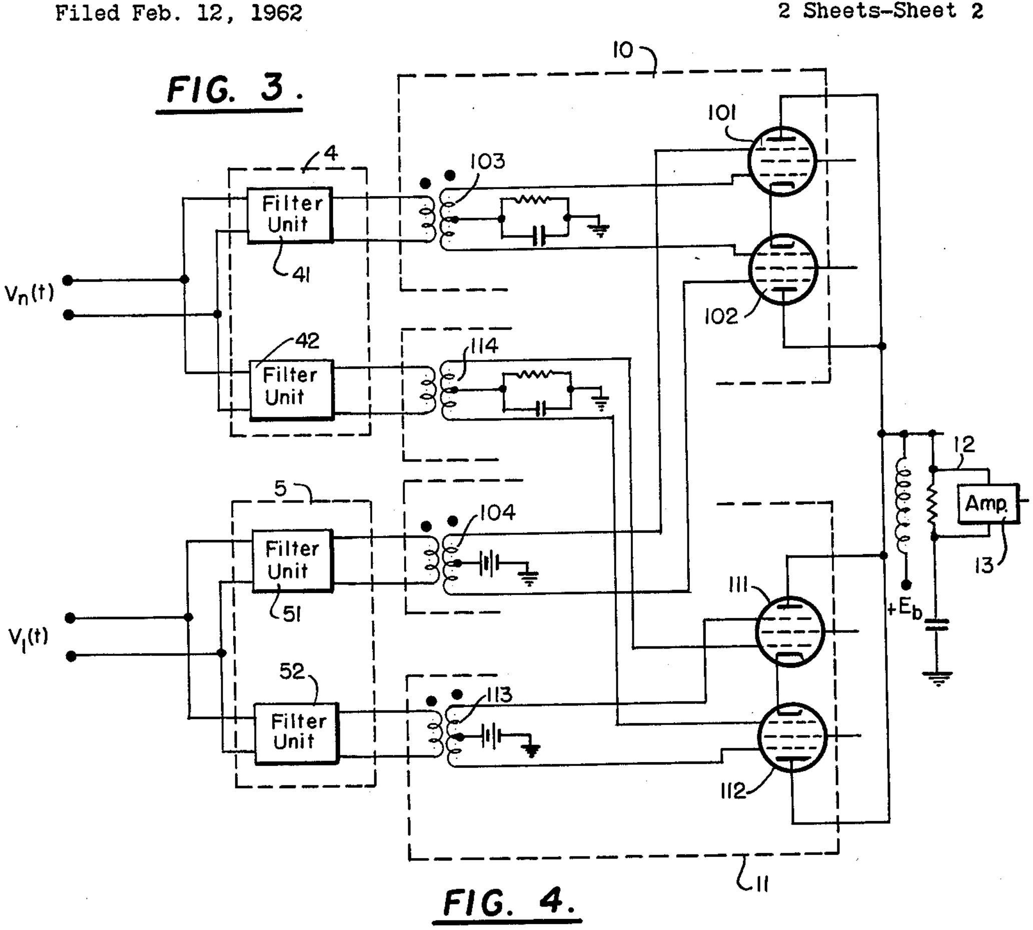
FIGURE 3 is a circuit diagram illustrating the circuit details of a portion of the block diagram of FIGURE 2.

INTERFERENCE REDUCTION CIRCUIT (1) *Recovery of weaker signal.*—A block diagram of the circuit is shown in FIGURE 2, while FIGURE 3 shows in greater detail a possible arrangement of the phase shift and multiplier circuits. It is emphasized that these latter circuits are shown only for illustrative purposes to add clarity to the block diagram; other arrangements are possible as will be obvious to those versed in the art. For instance, in FIGURE 3 pentodes are used in the balanced multipliers, but circuits using triodes are also well known in the literature (i.e., balance modulation) and can be used with minor modifications. FIGURE 3 also shows transformer coupling; however, push-pull exciting arrangements based on resistance-coupled amplifiers have been devised (see M. S. Wheeler, "An Analysis of Three Self-Balancing Phase Inverters," Proc I.R.E. volume 34, p. 67, February 1946) and can be used with advantage.

In FIGURE 2 it is assumed that the circuit is the first following the intermediate-frequency amplifier and that its input is the intermediate-frequency voltage $V_{0c}(t)$ given in Equation 3. For simplicity, neglecting noise, this voltage is given by $$V_0(t)=E_b[x\cos(\beta_0+\psi_a)+\cos(\beta_0+\psi_b)]$$

where the symbols have already been defined above. From this voltage two voltages are derived as follows:

(*a*) A voltage $V_h(t)$ (subscript *h* is used to indicate that the voltage is at the intermediate frequency) by passing $V_0(t)$ through the isolator 1 which provides isolation and impedance matching; hence $V_h(t)$ may differ in amplitude and phase from that of $V_0(t)$ and can be written $$V_h(t)=k_1[x\cos(\beta_{01}+\psi_{21}+\theta_1)+\cos(\beta_{01}+\psi_{b1}+\theta_1)]$$

where: $k_1$=a constant, $\theta_1$=constant phase angle, and the integer 1 is added to the subscript of the phases to indicate any phase effect caused by isolator 1;

(*b*) A voltage $V_l(t)$ (subscript *l* is used to indicate that the voltage is about zero frequency) by feeding $V_0(t)$ to the squarer 2 and thence to filter 3. The squarer 2 has the transfer characteristic $z=\alpha y^2$ and provides an output that comprises mainly terms about zero frequency and terms about twice the intermediate-frequency carrier. The filter 3 removes D.C. terms and terms about twice the carrier frequency and, with respect to those frequencies which lie within the pass band, introduces an amplitude factor and a linear phase shift. The output of the filter, therefore, consists only of the cross term about zero frequency and can be written $$V_l(t)=K_3x\cos(\psi_{a3}-\psi_{b3})+R_{es}$$

where: $K_3$=constant, and the integer 3 is added to the subscript of the phases to indicate the effect of the filter 3 and $R_{es}$ represents small amplitude residues arising from the fact that the squarer is not a perfect device.

From these voltages, the cosine and sine members of the identity (2) given previously are formed. To this end $V_h(t)$ and $V_l(t)$ are passed through the 90 degree phase shifting networks 4 and 5, respectively. As indicated in FIGURE 3, each of these phase shifters consists of a pair of filter units. Phase shifter 4 includes filter units 41 and 42, while phase shifter 5 similarly includes filter units 51 and 52, designed to operate at a frequency appropriate for the voltage input in accordance with the theory developed by Darlington and others whose works have previously been referred to. More specifically, the characteristics of these filters can bt made such that each frequency component of the input passes through the filter pair with an essentially constant amplitude change and the phases undergo a change that is very closely linear with frequency; moreover, the phase of components going through one member of each pair, such as 41 and 51, differs from that of corresponding components passing through the other member of the pairs, i.e., 42 and 52, by very nearly a constant amount equal to 90 degrees. Under these conditions the output voltages (except for a change in phase by a constant amount) retain the same relative frequency composition as the input. Therefore, the voltages can be written in the same form as the input and if the outputs of one member of the pairs, say 41 and 51, are labeled cosines the output of the other members will be sines; accordingly, using the subscript *c* and *s* to differentiate the cosine and sine output in the above sense, the output of 41 and 42 is approximately (in deriving the equations, ideal characteristics are assumed)

$$V_{hc}(t)=K_1K_4[x\cos(\beta_0+\psi_{a14}+\theta_{14})+\cos(\beta_0+\psi_{b14}+\theta_{14})]$$

$$V_{hs}(t)=K_1K_4[x\sin(\beta_0+\psi_{a14}+\theta_{14})+\sin(\beta_0+\psi_{b14}+\theta_{14})]$$

and that of 51 and 52

$$V_{lc}(t)=K_3K_5\,x\cos(\psi_{a35}-\psi_{b35})$$

$$V_{ls}(t)=K_3K_5\,x\sin(\psi_{a35}-\psi_{b35})$$

where $\theta_{14}$ and $\theta_{35}$ are constant phase angles and where the integer subscripts have been added to the phases to account for the effect of the networks on the frequency component of these waves. It should be noted that the network is designed so that, ideally, $\psi_{a,b14}=\psi_{a,b35}$.

These voltages appear on the lines 6, 7, 8 and 9, respectively, of the block diagram; voltages $V_{hc}(t)$ and $V_{lc}(t)$ are applied to the balanced multiplier 10 and voltages $V_{hs}(t)$ and $V_{ls}(t)$ to balanced multiplier 11. Each of these multiplier circuits is shown in greater detail in FIGURE 3. Multiplier 10 is seen to comprise two pentodes 101 and 102 connected in push-pull, balanced phase splitting transformers 103 and 104, and other necessary coupling, biasing and balancing elements that are, however, not relevant to this discussion and mostly not shown. Similarly, multiplier 11 consists of pentodes 111 and 112 and transformers 113 and 114 together with the same necessary but not relevant elements.

Focusing attention on multiplier 10 in FIGURE 3, its operation is as follows: The voltage $V_{hc}(t)$ from filter unit 41 is applied to transformer 103 the secondary of which is center-tapped and the center tap is connected to ground through a network that provides grid bias. By this connection the voltages at the two secondary terminals are 180 degrees out of phase with respect to ground; it will be assumed that the voltage at the upper terminal is positive and equal to $+V_{hc}(t)$, then, that at the lower terminal is negative and equal to $-V_{hc}(t)$. These voltages are applied to the grids of tubes 101 and 102, respectively.

The voltage $V_{lc}(t)$ from network 51 is applied similarly to the suppressor grids of these tubes through transformer 104 which has the center tap on the secondary connected to a grounded source of positive bias for the grids. Again it will be assumed that the connections are such that the upper terminal voltage is positive, equal to $+V_{lc}(t)$, and it is applied to the suppressor of 101; while the lower terminal voltage is equal to $-V_{lc}(t)$, and it is applied to the tube 102.

Now it can be shown that the tube characteristics are such that the plate voltage output $e_p$ under conditions of simultaneous excitation of the control grid with a voltage $e_{g1}$, and of the suppressor grid with a voltage $e_{g3}$ is equal to the product of the plate outputs when the two grids are excited severally, that is, if $(e_p)_c$ is the plate output when the control grid is excited with $e_{g1}$ (and the other grid is held fixed) and $(e_p)_s$ is the plate output when the suppressor grid is similarly excited with $e_{g3}$, the output $e_p$ when both grids are excited simultaneously is $$e_p=(e_p)_c(e_p)_s$$

Further, it can be shown that $$(e_p)_c = a_0 + a_1 e_{g1} + a_2 e_{g1}^2 + \ldots$$

and $$(e_p)_s = b_0 + b_1 e_{g3} + b_2 e_{g3}^2 + \ldots$$

where the $a$'s and $b$'s are constant for a given tube and operating point. Therefore, when the excitation is given by the push-pull arrangement described above (i.e., $e_{g1} = v_{hc}$, $e_{g3} = v_{lc}$) the output $e_{p10}$ of multiplier 10 consisting of tubes 101 and 102 is $$e_{p10} = 2(a_0 b_0 + a_0 b_2 v_{lc}^2 + a_1 b_1 V_{hc} V_{lc} + a_2 b_0 V_{hc}^2 + a_2 b_2 V_{hc}^2 V_{lc}^2)$$

The operation of multiplier 11 is similar except that the voltages fed into it are 90 degrees out of phase with respect to corresponding voltages fed into 10 and one of the voltage pairs, specifically $+v_{hs}$, $-v_{hs}$, is applied to tubes 111 and 112 shifted in phase 180 degrees with respect to the application of the corresponding cosine voltages to tubes 101 and 102. This is simply done by feeding the output of the negative terminal of transformer 114 to the grid of tube 111 and the output of the positive terminal to tube 112 (note the reversal of the reference dot on transformer 114) while feeding the voltage output pair $+v_{es}(+)$ and $-v_{es}(+)$ of transformer 113 to tubes 111 and 112 in the same reference as done for voltage-pair $+V_{lc}$ and $-V_{lc}$ in the case of tubes 101 and 102. This reversal of phase in the application of $V_{hs}$ causes the output $e_{p11}$ of multiplier 11 to be $$e_{p11} = 2(a_0 b_0 + a_0 b_2 V_{ls}^2 - a_1 b_1 V_{hs} V_{ls} + a_2 b_0 V_{hs}^2 + a_2 b_2 V_{hs}^2 V_{ls}^2)$$

The reason for reversing the phase of the voltage $v_{hs}$ is to obtain a negative sign in front of the term $a_1 b_1 v_{hs} V_{ls}$. This is necessary in order to obtain the desired result by addition of the voltages $e_{p10}$ and $e_{p11}$. This addition, as well as the addition of the individual tube voltages, is accomplished in the adder 12 which as seen more clearly in FIGURE 3 is achieved simply by tying all the plates to the common load 12. If the phase had not been reversed, the sign of this term would be positive and then a subtraction of the two voltages would be required; circuits of course could also be designed to obtain the result in this way.

These remarks become clearer if the expressions for the voltages $V_{hc}$, $V_{hs}$, et cetera, are introduced in the expressions for $e_{p10}$ and $e_{p11}$ and the expansions obtained. However, these expansions are rather involved and will not be given here. It is sufficient to note that, since filter 13 removes D.C. components and components which are multiples of the intermediate-frequency carrier, the result contains only terms about the intermediate-frequency carrier so that the voltage $e_p = e_{p10} + e_{p11}$ is $$e_p = 2a_1 b_1 k_n k_e \times [x \cos(\beta_0 + 2\psi_{a1} - \psi_{b1} + \theta_h) + \cos(\beta_0 + \psi_{21} + \theta_h)]$$

where $$k_n = k_1 k_4,\ k_e = k_3 k_5,\ \psi_{a1b1} = \psi_{a1b14} = \psi_{21b35}$$

and $$\theta_h = \theta_{14}$$

This voltage in passing through amplifilter 13 is multiplied by a constant $k_a$ such that $$2k_a a_1 b_1 k_h k_e = E_b$$

and the phase of each frequency component is displaced linearly so that if $E_1(t)$ represents the output of the amplifier, we can write $$E_1(t) = E_b \times [x \cos(\beta_0 + 2\psi_{a2} - \psi_{b2} + \theta_2) + \cos(\beta_0 + \psi_{a2} + \theta_2)]$$

where $\theta_2 = \theta_n +$ phase contribution by amplifilter 13 and $\psi_{a2}$ and $\psi_{b2}$ are written in place of $\psi_{a1}$ and $\psi_{b1}$ to account for the effect on the phase of their frequency component by the amplifilter.

Amplifilter 13 provides two outputs, one on lead 14 and one on lead 15. The outputs have the same amplitude, but the one on lead 15 is inverted in phase 180 degrees. Therefore, if $E_1(t)$ and $E_{15}(t)$ represent the output of the amplifier on lead 14 and 15, respectively, we can write $$E_1(t) = E_b \times [x \cos(\beta_0 + 2\psi_{a2} - \psi_{b2} + \theta_2) + \cos(\beta_0 + \psi_{a2} + \theta_2)]$$

and then the output on lead 15 is $$E_{15}(t) = -E_1(t)$$

The output $E_{15}$ is used in improving the $b$-signal-to-total interference ratio as described below, while the use made of output $E_1(t)$ depends on whether or not the interference reduction circuit is the terminal one (i.e., the one before the detector). If it is a terminal circuit, then $E_1(t)$ is fed to amplifier 17 for the purpose to be described presently, while if it is not, $E_1(t)$ is brought to output terminal 16 for distribution to the next interference reduction circuit.

As indicated by the above expression for $E_1(t)$, its amplitude is proportional to $x$. This amplitude is desired if repetitions of the interference reductions operations are involved, but if this is not the case and $E_1(t)$ is to be fed to a detector then its amplitude must be independent of $x$ and must be of a magnitude that is proper for the detector. The amplifier 17 is designed to achieve these two requirements: its phase is made essentially linear and its gain is made proportional to $x$. This can be achieved within limits that in practice are set by circuit noise and stability considerations, to give, for a relatively slowly varying input, a constant output which can be fixed at the value required by the detector circuits.

In many cases of practical interest (i.e., when $x$ remains constant during a given reception) the adjustment of gain could be manual. However, this need not be so even in such cases because a voltage that is proportional to $x$ can be obtained and this can be used to control the gain of amplifier 17. The source of this voltage is $V_1(t)$ which is seen to have an amplitude proportional to $x$. Hence a sample of this voltage is taken from the output of filter 3 and is fed to an isolating and rectifier circuit 18. The output of this rectifier properly filtered is applied to amplifier 17 to control its gain as done in AVC practice. The output $E_{01}(t)$ of the amplifier is, therefore.

$$E_{01}(t) = E_b[x \cos(\beta_0 + 2\psi_{a3} - \psi_{b3} + \theta_3) + \cos(\beta_0 + \psi_{a3} + \theta_3)]$$

where the subscript 3 on the phases is used to account for the phase translation caused by the amplifier. This output is brought to terminal 19.

It is clear that the voltage $E_1(t)$ has the same form as the voltage $E_1(t)$ of Equation 7 and is, therefore, the desired voltage; in it, as well as in $E_{01}(t)$ the term with the signal modulation on the weaker carrier is predominant.

The approximation in the result would be replaced by equality if the amplitude characteristic with frequency of the networks were absolutely constant and if their phase characteristics were linear; since these characteristics cannot be achieved exactly in practice, the voltages $E_1(t)$ and $E_{01}(t)$ in addition to the terms shown will contain other terms. However, the magnitude of these terms will be small, the actual values depending on the amplitude balance achieved and on the tolerance used in the design of the networks. If all these residues are grouped into one term denoted by $R_1$ and this is inserted in the expression for $E_1(t)$ the equality sign can be used, thus $$E_1(t) = E_b \times [x \cos(\beta_0 + 2\psi_{a3} - \psi_{b3} + \theta_3 + \cos(\beta_0 + \psi_{b3} + \theta_3)] + R_1$$

In the derivation above, the noise has been neglected because its presence would have complicated unbearably the various expressions. However, if the signal-to-noise-ratio meets certain requirements, the presence of noise will not destroy the predominance of weaker signal modulations term in $E_1(t)$.

(2) *Improvement of the strong signal-to-noise ratio.*—According to the theory which has been presented, if the voltage $E_1(t)$ is subtracted from the input $V_0(t)$ that has been translated in phase an amount equivalent to the phase translation in $E_1(t)$, the result is a wave in which signal-to-total interference ratio of the signal on the stronger carrier is greater than it was in the original wave $V_0(t)$.

This result is achieved in FIGURE 2 by the circuits 13, 20, 21, 22 and 23. Specifically, as pointed out above, amplifier 13 gives an output $E_{15}(t)$ which, being 180 degrees out of phase relative to $E_1(t)$, is simply the negative of it; hence, the output $E_{15}(t)$ on line 15 is fed into the adder 23.

The adder 23 also receives a voltage $V_{h1}(t)$ derived from the voltage $V_0(t)$. In deriving this voltage, $V_0(t)$ is fed through an isolating circuit 20 which gives an output equal to $K_{20}V_0(t)$, to a phase-corrector 21 and to an amplifier 22. These two units are designed in combination to provide (1) a phase characteristic that is essentially linear, with a slope equal to the sum of the slopes of the networks employed in the generation of $E_1(t)$ and phase intercept at the carrier equal to $\theta_2$ (i.e., the phase angle of $E_1(t)$ at the same point), and (2) an amplitude characteristic that multiplies the input by a constant $k_{21}$ such that $$k_{21}k_{20}=E_b$$

The output of the amplifier 22 is, therefore $$V_{n1}(t)=E_b[x\cos(\beta_0+\psi_{a2}+\theta_2)+\cos(\beta_0+\psi_{b2}+\theta_2)]$$

This voltage is fed to the adder the output of which $V_{01}(t)$ is obviously $$V_{01}(t)=V_{h1}-E_1(t)=E_b[\cos(\beta_0+\psi_{b2}+\theta_2) -x^2\cos(\beta_0+2\psi_{a2-b2}+\theta_2)]$$

The same remarks made concerning the approximation in the case of $E_1(t)$ apply here too. But now in addition to the residues $R_1$ there will also be another class of residues $R_2$ which arise because phase and amplitude equalization in the phase translation of $V_0(t)$ and in the adding operation in practice cannot be perfect.

The output of the adder is brought to terminal 24 for distribution to the following circuit or to the detector 34.

(3) *Test Circuit.*—It has been pointed out repeatedly that in order to keep small the amplitude of unwanted residues in the output, it is necessary to control carefully the phase and amplitudes relationship of voltages that are finally added. As regards phase, most of this control is exercised by design, especially in the phase shifters 4 and 5, phase corrector 21, filter 3, and amplifier filter 13; techniques for designing these circuits to prescribed tolerances are well known and little can be done once the design is fixed except minor adjustments. In the case of amplitude also a good deal of control is exercised by design, this is particularly so in the case of multipliers 10 and 11; but even after this is done some amplitude control will still be possible (and necessary because of aging of circuit components) by optimizing bias voltages in various parts of the circuit such as in the multipliers themselves, in the isolation units, and in the amplifiers.

It would be very difficult if not impossible to make these final balancing adjustments under actual operating conditions. For this reason a test circuit 25 is provided with means (not shown) for isolating the interference reduction circuit under test from other circuits, means for connecting the test voltages to the input and other points, and controls in various components for optimizing the operating conditions.

The only peculiarity about the test circuit is the voltages it supplies. The test circuit is designed to provide the following voltages $$V_c(t)=k\cos(\beta_0+2\pi ft)+\cos\beta_0$$

and $$V_s(t)=k\sin(\beta_0+2\pi ft)+\sin\beta_0$$

where $k$ is a constant less than $l$ and $f$ an audio frequency, the value of both being known.

As shown in FIGURE 2, each interference reduction circuit has three individual output terminals. A terminal 24 is the one which receives the signal in which the stronger signal has had its signal-to-noise ratio improved. It is this terminal point 24 which should be connected to the single input terminal of each interference reduction circuit when the overall objective is to improve the signal-to-noise ratio of the stronger signal. On the other hand, terminals 16 and 19 receive the output of the interference reduction circuit wherein the weaker signal has been made predominant. When the overall objective of the system is to provide for the recovery of the weaker signal, then each interference reduction circuit after the first should be connected to either terminal 16 or terminal 19 of the preceding interference reduction circuit. The connection should be made to terminal 19 where the intereference reduction circuit is the last one and its output is to be supplied to a detector. However, the connection should be made to terminal 16 when the signal is intended to be applied to a further interference reduction circuit.

FIGURE 1 shows diagrammatically one way in which the circuit selection may be made. A relay R1 is selectively picked up or dropped away in accordance with the position of the manually-operated push button PB. When relay R1 is dropped away as shown in FIGURE 1, its contact RIA connects the input of detector 34 to terminal 24. At the same time, other contacts of this relay connect the input terminals of the respective interference reduction circuits to the corresponding output terminal 24 of the next preceding interference reduction circuit as is diagrammatically shown. In other words, when relay R1 is dropped away, the various interference reduction circuits then become effective to improve the signal-to-noise ratio of the stronger signal. If, on the other hand, relay R1 is picked up, the detector 34 is connected to output terminal 19 of the Nth interference reduction circuit 33. At the same time, other contacts of relay R1 connect each input terminal of the respective interference reduction circuits to the output terminal 16 of the immediately preceding interference reduction circuit. Under these circumstances, the various interference reduction circuits become effective to aid in recovery of the weaker signal.

It will be understood, of course, that it is not necessary that both functions, i.e., recovery of the weaker signal and improvement of signal-to-noise ratio of the stronger signal be provided in each interference reduction circuit. More specifically, if it is determined that only recovery of the weaker signal is desired, then the isolator 20, phase director 21, amplifier 22 and adder 23 of FIGURE 2 may all be eliminated. When this is done, it then also is no longer necessary to provide for selection between the different outputs of each interference reduction circuit.

Having described a method and apparatus for reducing interference in a communication system, I desire it to be understood that various modifications, adaptations and alterations may be made to the specific method and apparatus disclosed without departing from the spirit or scope of my invention.

I claim:

1. In a communication circuit receiving an input wave comprising both a desired wave and an undesired wave with the undesired wave being of greater amplitude than the desired wave, the method of producing a wave which includes the desired wave in association with a new wave representing the undesired wave but being of smaller amplitude than the desired wave, said method comprising the steps of:

(a) squaring said input wave and filtering the squared wave to pass substantially only the cross product of the desired and undesired waves;

(b) shifting the phase of said input wave to produce a wave which is in time coincidence with said cross product wave obtained by the squaring operation of step (a);

(c) multiplying the cross product wave obtained by step (a) with the phase-varied wave obtained by step (b);

(d) shifting the phase of the wave obtained from step (a) by substantially 90°;

(e) shifting the phase of the wave obtained from step (b) by substantially 90°;

(f) multiplying the phase shifted wave obtained from step (d) by the phase shifted wave obtained from step (c);

(g) subtracting from the wave resulting from step (c) the wave resulting from step (f); whereby the difference wave obtained as the result of step (g) includes the desired wave in association with the undesired wave with respect to which it is larger in amplitude.

2. The method of claim 1 in which the series of steps (a) through (g) is repeated at least once, the input wave on the second and following times being the wave produced by step (g) of the preceding time.

3. The method as defined in claim 1 wherein said desired and undesired waves are both frequency-modulation signals at an intermediate frequency.

4. The method as defined in claim 2 in which the several steps are carried out in a frequency-modulation receiver prior to the detector of said receiver.

5. The method of transforming an intermediate-frequency in a frequency-modulation receiver where said signal comprises a desired frequency-modulation wave together with a stronger undesired frequency-modulation wave and with said method comprising the steps of:

(a) squaring said intermediate-frequency signal and filtering the resulting squared signal to pass substantially only the cross product of the desired and undesired waves;

(b) varying the phase in the input signal to bring it into time coincidence with the squared and filtered signal produced according to step (a);

(c) shifting the phase of the signal obtained by step (a) by substantially 90°;

(d) shifting the phase of the signal produced by step (b) by substantially 90°;

(e) multiplying the signal obtained by step (a) by the signal obtained by step (b);

(f) multiplying the signal obtained by step (c) by the signal obtained by step (d);

(g) subtracting the signal obtained by step (e) from the signal obtained by step (f); whereby the signal obtained as a result of step (g) contains the desired signal in association with a new signal representing the undesired wave which is now of substantially smaller amplitude than the desired wave.

6. The method of claim 5 in which the series of steps (a) through (g) is repeated at least once, the input wave on the second and following times being the output wave produced by step (g) the preceding time.

7. The method of acting upon a frequency-modulated input signal containing both desired and undesired waves and expressed as $$V_{oc}(t)=x\cos(\beta_0+\psi_a)+\cos(\beta+\psi_b)$$

where $\beta_0$ is the intermediate frequency, $\psi_a$ is the phase containing the desired modulation, $\psi_b$ is the phase containing the undesired modulation, and where $x$ is the ratio of the amplitude desired wave to the amplitude of the undesired wave and is less than one, the method comprising the steps of:

(a) squaring the input signal $V_{oc}(t)$ and filtering the resulting product to produce a wave expressed as $$X_c(t)=x\cos(\psi_a-\psi_b)$$

(b) shifting the phase of $V_{oc}(t)$ to bring it into time coincidence with $X_c(t)$;

(c) shifting the phase of $X_c(t)$ by substantially 90° to provide a voltage $X_s(t)=x\sin(\psi_a-\psi_b)$ (d) shifting the phase of the wave formed by the process of step (b) to produce a wave $$V_{os}(t)=x\sin(\beta_0+\psi_a)+\sin(\beta_0+\psi_b)$$

(e) multiplying the waves produced by steps (a) and (b) and also multiplying the waves produced by steps (c) and (d) and subtracting the resulting product waves from each other to thereby produce a difference wave $$E_{1c}(t)=x\cos(\beta_0+\psi_a)+x^2\cos(\beta_0+2\psi_a-\psi_b)$$

whereby the difference signal produced as a result of step (e) comprises the desired signal in association with the undesired signal which is now of substantially smaller amplitude than the desired signal.

8. In a receiver receiving an input wave comprising a stronger wave together with a weaker wave, a method for transforming said input wave to form a new wave in which the stronger wave appears in purer form, said method comprising the steps of:

(a) squaring said input wave and filtering the resulting squared signal to pass substantially only the cross product of the stronger and weaker wave;

(b) varying the phase of the input signal to bring it into time coincidence with the squared and filtered signal produced by step (a);

(c) shifting the phase of the signal obtained by step (a) by substantially 90 degrees;

(d) shifting the phase of the signal produced by step (b) by substantially 90 degrees;

(e) multiplying the signal obtained by step (a) by the signal obtained by step (b);

(f) multiplying the signal obtained by step (c) by the signal obtained by step (d);

(g) subtracting the signal obtained by step (e) from the signal obtained by step (f);

(h) subtracting the input wave from the signal obtained by step (g); whereby the wave resulting from step (h) contains the stronger wave in association with the weaker wave but with the stronger wave being of greater relative amplitude with respect to the weaker wave than it was in the input signal.

9. The method of claim 8 in which said receiver is a frequency-modulation receiver and said stronger and weaker waves are both frequency modulated intermediate-frequency waves.

10. The method of transforming an input wave which includes both a stronger frequency modulated wave and a weaker frequency modulated wave comprising the steps of:

(a) shifting the phase of the input wave by substantially 90 degrees;

(b) transforming the input wave to produce a wave whose argument is a function of both said stronger and weaker waves;

(c) shifting the phase of the wave produced by step (b) by substantially 90 degrees;

(d) multiplying the input wave by the wave produced by step (b) and also multiplying the waves produced by steps (b) and (c) and subtracting the resulting product waves from each other to thereby produce a difference wave in which the originally weaker wave is predominant in amplitude.

11. The method of claim 10 which includes the added step of subtracting the input wave from the difference wave produced by step (*d*) to thereby produce another difference wave in which the stronger wave is of greater amplitude relative to the weaker wave than it was in the input wave.

12. The method of transforming an input wave in which the operation comprising the method steps of claim 10 is carried out a plurality of times, the input wave on successive operations of said method being the output wave produced by step (*d*) on the preceding operation.

13. The process of transforming an input wave in which the operation comprising the successive method steps of claim 11 is carried out a plurality of times, the input wave on successive operations being the output wave produced on said added step as defined in claim 11.

14. A circuit organization for transforming a frequency-modulated wave which includes both a weaker wave and a stronger wave and comprising in combination, first means responsive to said input wave for producing a first output wave whose argument is a function of both the desired and undesired waves, second means for multiplying said input wave and said first wave, third means for shifting the phases of both said input wave and said first wave by substantially 90 degrees, fourth means for multiplying together said quadrature-shifted waves produced by said third means, and fifth means for subtracting said product waves produced respectively by said fourth and second means to produce a difference wave in which the desired wave is now included in association with a new wave containing the stronger signal with respect to which the weaker signal is now of greater amplitude.

15. The circuit organization of claim 14 in which said second means also includes means for time shifting said input wave to bring it substantially into time coincidence with respect to said first wave before multiplication.

16. The circuit organization as defined in claim 14 wherein said first means includes means for squaring said input wave and for filtering the squared wave to pass substantially only the component which represents the cross product component of said stronger and said weaker waves.

17. The apparatus of claim 14 which includes further means for subtracting the input wave from said difference wave, whereby a wave is produced by said last-named means in which said stronger wave is now of greater amplitude with respect to said weaker wave than it was in the input signal.

18. A frequency-modulation receiver including at least two iterated circuit organizations each constructed as defined in claim 14 and connected ahead of the audio detector of said receiver, each said circuit organization after the first receiving the output signal produced by said fifth means of the preceding circuit organization.

19. A frequency-modulation receiver including at least two iterated circuit organizations, each of the type as defined in claim 17 and connected ahead of the audio detector of said receiver, each said circuit organization after the first receiving as an input signal the output signal produced by the further means of claim 17.

20. The circuit organization of claim 17 in which said further means includes means for shifting the phase of the input signal to bring it into time coincidence with said difference wave prior to subtraction of said input wave from said difference wave.

21. The circuit organization of claim 14 which further includes amplifier means responsive to said difference wave and having its gain controlled in accordance with the amplitude of the output of said first means.

22. Apparatus for transforming a frequency-modulated wave which includes both a stronger wave and a weaker wave together and comprising in combination, first means for phase shifting said input wave by substantially 90 degrees, second means responsive to said input wave for producing a new wave whose argument is a function of both said stronger and weaker waves, third means for shifting the phase of the wave produced by said second means by substantially 90 degrees, fourth means including a balanced push-pull multiplier each half of which is responsive to both said waves produced respectively by said first and third means, adding circuit means connected to the output of said multiplier, and amplifier means connected to the output of said adding circuit means.

23. The apparatus as defined in claim 22 in which said amplifier means has a variable gain, and means governed by the amplitude of the output of said second means for varying the gain of said amplifier means.

24. The apparatus as defined in claim 22 which includes further means for shifting the phase of said input wave to bring it into time coincidence with the output of said amplifier means, and means for subtracting the phase shifted output of said further means from the output of said amplifier means.

No references cited.